US007134077B2

(12) United States Patent
Sellen et al.

(10) Patent No.: US 7,134,077 B2
(45) Date of Patent: Nov. 7, 2006

(54) TEXT PROCESSING SYSTEM

(75) Inventors: Abigail Jane Sellen, Newbury (GB); Barry Allen Thomas Brown, Bristol (GB); Andrew Dudley Morgan, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1175 days.

(21) Appl. No.: 09/773,090

(22) Filed: Jan. 31, 2001

(65) Prior Publication Data

US 2002/0062326 A1    May 23, 2002

(30) Foreign Application Priority Data

Nov. 22, 2000   (GB)   ................................. 0028418.2

(51) Int. Cl.
*G06F 15/00* (2006.01)
*G06F 3/00* (2006.01)
*G09G 5/00* (2006.01)

(52) U.S. Cl. ...................... 715/531; 715/526; 715/530; 715/700; 715/711; 345/156; 345/676

(58) Field of Classification Search ................ 715/513, 715/530–531, 517, 515, 526, 700, 711; 709/203, 709/204, 220, 232, 246; 345/156, 676
See application file for complete search history.

(56) References Cited

U.S. PATENT DOCUMENTS

| 5,276,796 | A  | * | 1/1994 | Yamada et al. ............. 715/531 |
| 6,212,577 | B1 | * | 4/2001 | Stern et al. .................. 719/329 |
| 6,396,598 | B1 | * | 5/2002 | Kashiwagi et al. ............ 707/6 |
| 6,487,597 | B1 | * | 11/2002 | Horie et al. ................ 709/227 |
| 6,587,132 | B1 | * | 7/2003 | Smethers ..................... 715/531 |
| 6,691,153 | B1 | * | 2/2004 | Hanson et al. .............. 709/204 |
| 6,704,024 | B1 | * | 3/2004 | Robotham et al. .......... 709/203 |
| 6,727,894 | B1 | * | 4/2004 | Karidis et al. .............. 345/174 |

FOREIGN PATENT DOCUMENTS

WO    WO 90/15380    12/1990

* cited by examiner

*Primary Examiner*—William Bashore
*Assistant Examiner*—Chau Nguyen

(57) ABSTRACT

An auxiliary screen unit is provided in conjunction with a desktop personal computer, for use in connection with editing a reading operations. The auxiliary screen unit has a touch-sensitive screen and stylus by means of which a user may operate a graphical user interface to select, highlight or otherwise edit text; edits may be performed on text displayed on the computer screen in the normal way using a mouse and a graphical user interface. The auxiliary screen unit and the computer are connected directly to each other so that text selected on one screen may be imported directly onto the other screen. Such an apparatus thus provides similar functional capability to that of paper, which is still the medium of choice for formulating edits.

18 Claims, 3 Drawing Sheets

Fig. 2

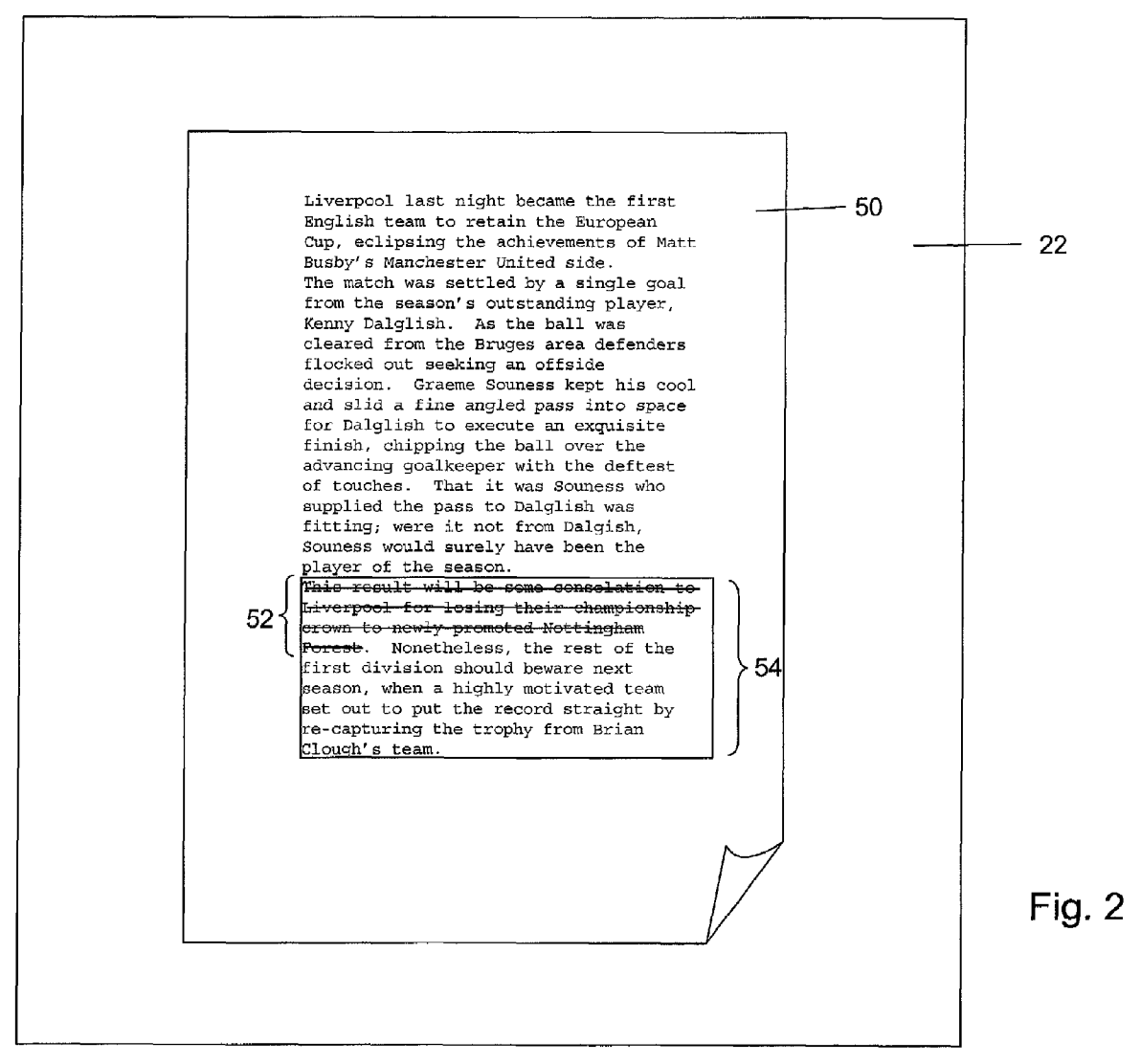

Liverpool last night became the first English team to retain the European Cup, eclipsing the achievements of Matt Busby's Manchester United side.
The match was settled by a single goal from the season's outstanding player, Kenny Dalglish. As the ball was cleared from the Bruges area defenders flocked out seeking an offside decision. Graeme Souness kept his cool and slid a fine angled pass into space for Dalglish to execute an exquisite finish, chipping the ball over the advancing goalkeeper with the deftest of touches. That it was Souness who supplied the pass to Dalglish was fitting; were it not from Dalglish, Souness would surely have been the player of the season.
~~This result will be some consolation to Liverpool for losing their championship crown to newly promoted Nottingham Forest.~~ Nonetheless, the rest of the first division should beware next season, when a highly motivated team set out to put the record straight by re-capturing the trophy from Brian Clough's team.

TEXT PROCESSING SYSTEM

BACKGROUND OF THE INVENTION

1. Field of the Invention

The present invention relates to the processing of text, such as word processing, for example.

2. Discussion of the Background Art

Automated word processing systems have been in existence for many years in various forms, and they have provided substantial advantages in relation to text processing activities. However, the functional capability of existing word processing systems is frequently incompatible, at least to some extent, with the thought processes and behaviour of people involved in the preparation and amendment of documents. For example, existing word processing systems which provide an extra screen, and/or a plurality of "windows" per screen do not provide the functional capability of paper. For example, existing word processing systems which provide an extra screen, and/or a plurality of "windows" per screen do not provide the functional capability of paper.

SUMMARY OF THE INVENTION

One aspect of the present invention lies in an appreciation of the fact that people preparing a document, either by combining or editing one or more earlier documents, or by referencing one or more other documents, are not able to do so in a manner which comes most naturally to them using a single screen word processing system. For example, people frequently revert to using paper in order to: formulate amendments to one document by incorporating text extracted from another document (whether or not the extracted text is itself modified prior to incorporation); referring to information in one document in order to create another document; or to check consistency between two documents.

An independent aspect of the present invention provides a text processing apparatus comprising:

- a first text editing unit having a screen upon which text may be displayed, and a first manual actuator by means of which a user is able to interact with text displayed on the first screen;
- a second text editing unit having a second screen upon which text may be displayed, and a second manual actuator by means of which a user is able to interact with text displayed on the second screen; wherein
- the first and second actuators are independently operable, and enable interaction with text displayed on respective screens independently of each other; and
- the first and second text editing units are connected to each other to enable text to be imported from one unit directly to another unit, thereby to enable text selected from a first document displayed on one unit to be inserted directly at a predetermined location in a document displayed on the other unit The two editing units thus enable the display of two documents simultaneously. The actuators, will typically be used to operate with graphical user interfaces, e.g. an actuator in the form of a mouse may be used to select from a pull-down menu or an icon.

In one preferred embodiment the first and second text editing units will be provided by a computing unit such as a personal-type computer, and an auxiliary screen unit which is detachably connectable to the computing unit. Amendments may be made to a block of text shown on the auxiliary screen, and the amended block of text then inserted into the document shown on the computing unit screen. The user is thus able to behave in a manner similar to the manner in which they would perform such operations when using paper: selecting the location at which the text is to be inserted into one document with one hand, while simultaneously selecting and/or amending the text from the other document which is to be inserted with the other hand.

In one embodiment the auxiliary screen unit has a touch-sensitive screen, and amendments or other annotations may be made to the text by means of a stylus moved across the surface of the touch-sensitive screen.

BRIEF DESCRIPTION OF THE DRAWINGS

Embodiments of the invention will now be described, by way of example, and with reference to the accompanying drawings, in which:

FIG. 2 is an illustration of text editing operations using an embodiment of text processing system according to the present invention;

DETAILED DESCRIPTION OF THE INVENTION

Figure 1:
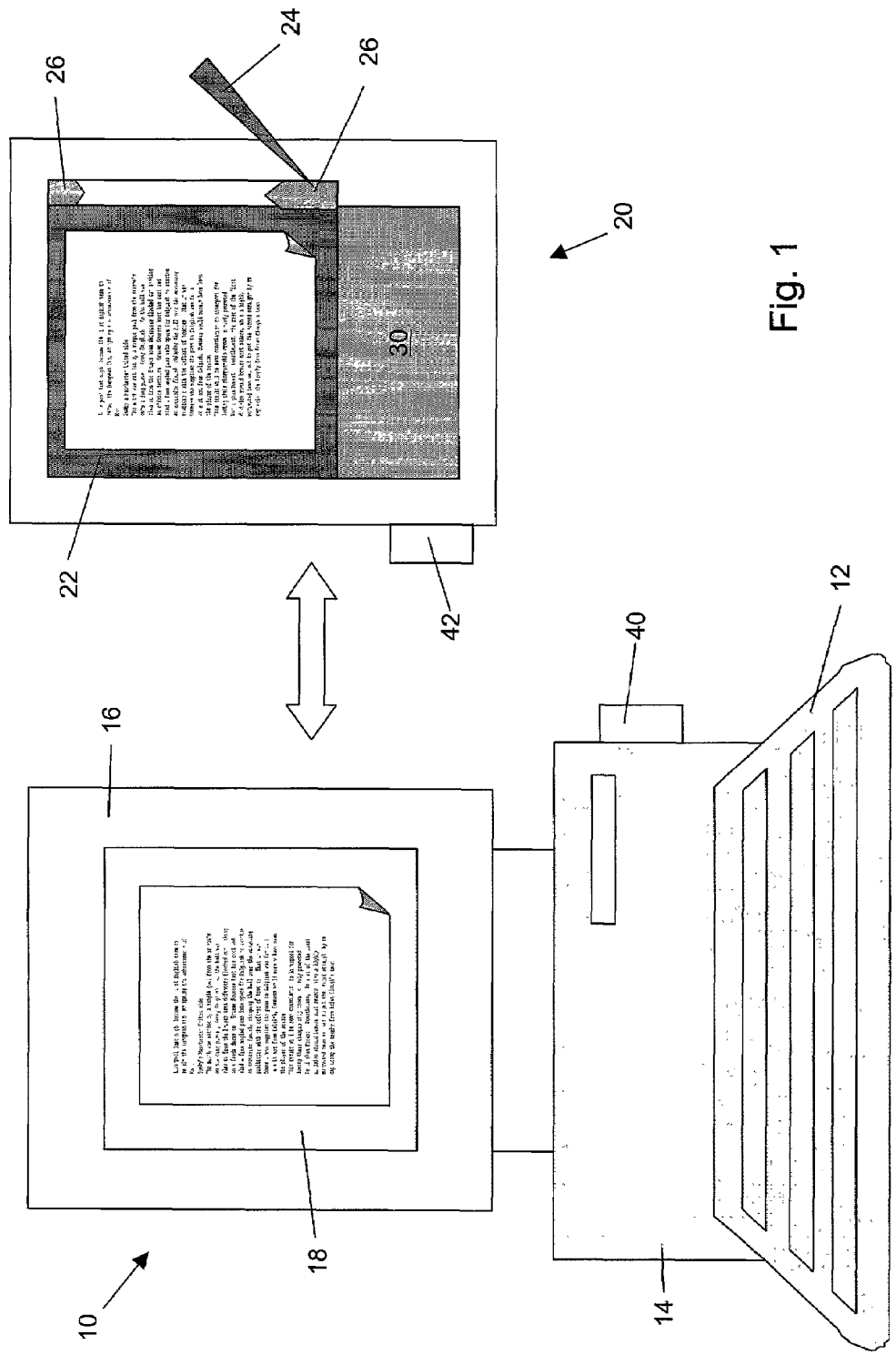
FIG. 1 is a general view of the appearance of a text processing system according to an embodiment of the present invention.

Referring now to FIG. 1, a text processing system includes first and second text-editing units, in this example provided by a personal-type computer unit 10 and an auxiliary screen unit 20. In the present example the computer unit 10 is a standard desktop "personal computer" ("PC"), adapted to run a program for processing text, typically a commercially available word processing package, and therefore has the usual form for such a computer (although no particular standard of computer or operating system are intended to be denoted by the use of this term): a keyboard 12, processor, memory and other usual computing elements contained within a box 14, and a visual monitor 16 having a screen 18 on which text can be displayed. Where desired the computer unit 10 may additionally comprise a mouse 13 or some other manual actuator in addition to the keyboard, to enable the user to operate the computer more easily using a graphical user interface.

The auxiliary screen unit 20 essentially functions, from the user's point of view, as an independent word processor having limited user-interaction. The auxiliary screen unit 20 has limited memory and processing capability (which will be described in more detail subsequently) sufficient to enable the running of a text-processing program, typically a cut-down version of the word processing package running on the computer unit 10 (i.e. uses the same or similar commands, and the same or similar text format control characters), although this is not essential provided that the cut-down word processing package is not incompatible with the word processing package on the computer unit 10. Interaction with the screen 22 of the auxiliary screen unit (e.g. inputting and editing of text) is achieved by means of a touch-sensitive screen 22 and stylus 24; the latter being a tool held by a user to touch the screen. The screen 22 and stylus 24 may thus be used to scroll up or down through text shown on the screen 22 using scroll bars 26 prevalent in the graphical user interfaces of contemporary word processing packages, to underline or delete text by selecting the text using the screen/stylus and then operating a tool button/icon or pull-down menu to perform the requisite operation, or to write text by scribing letters in the scribing pad 30, which scribed characters are converted to text on the screen by character-recognition software, known per se in the art, and which is therefore not shown or discussed further herein. In the present example the auxiliary screen unit 20 is portable and incorporates a portable battery power supply (not shown).

Both the computing and auxiliary screen unit 10, 20 include input/output ports 40, 42 to enable operable interconnection between. This interconnection may be by means of a tethered USB, by wireless connection such as "Bluetooth", or IEEE802.11 Wireless Ethernet. The portable nature of the auxiliary screen unit 20 allows, with the use of a dedicated attachment (not shown), for the auxiliary screen unit 20 to be clipped into a position adjacent the visual monitor 16, so that both screens may be placed in the mutually adjacent relationship shown in FIG. 1, which is frequently convenient for operations involving comparison of text in two documents.

The text processing system is intended to enable a user to edit text in a manner which is similar to that employed when using paper, which as mentioned above is still the medium of choice for many people when formulating amendments. Thus for example, referring now to FIG. 2, a document 50 is displayed on the screen 22 of the auxiliary screen unit 20. The user, by means of use of the stylus 24 and touch-sensitive screen 22 is able to edit the text shown. In the illustrated example the editing operations include the deletion of a section 52 of text, and the selection of a block 54 of text for importation into a document shown on the screen 18 of the computer unit 10. Typically these editing operations will be performed by selecting a particular editing option available in the word-processing package running on the auxiliary screen unit 20 (either by use of a pull-down menu or a tool button, for example), and then selecting the text to be subjected to the chosen editing operation using the stylus 24 and touch-sensitive screen 22. In the illustrated example, the block 54 of text selected for importation into the document displayed on the screen 18 of the computer unit 10 also includes the section 52 of deleted text; in use this is typically more likely to occur when a section of deleted text occurs in the middle of a block of text selected for importation.

Figure 3:
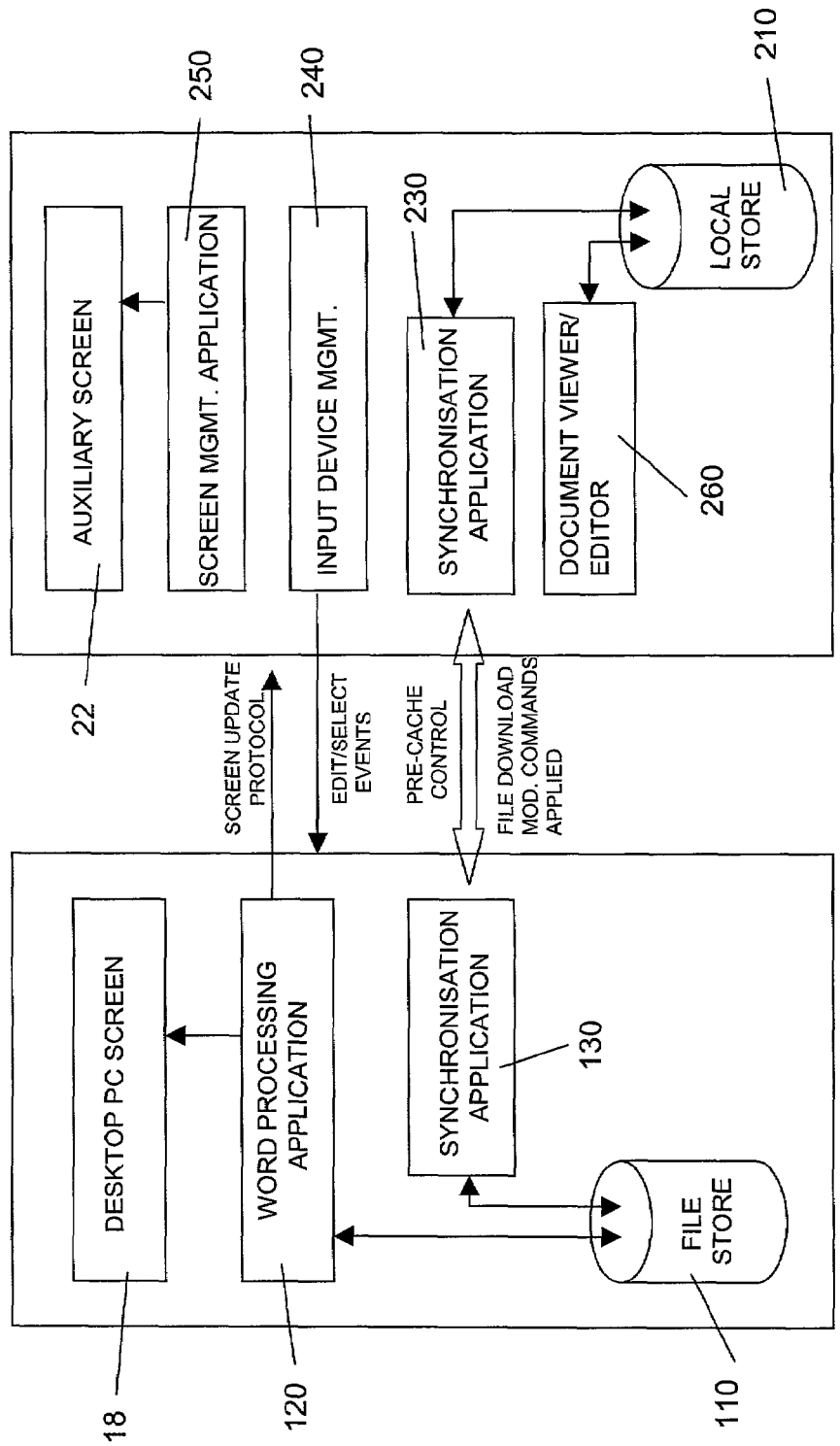
FIG. 3. is a schematic illustration of the architecture of an embodiment of text processing system according to the present invention.

The text processing system according to the present invention may be implemented using a number of architectures. According to one preferred architectural configuration, and referring now to FIG. 3, the computing unit 10 and the auxiliary screen unit 20 are in a client-server relationship, in which the computing unit 10 acts as the server. The computing unit 10 comprises a file store 110 for computer files which are effectively word processing documents that a word processing application 120 (i.e. the text processing program) is able, inter alia to retrieve and display on the screen 18 of the computing unit 10, i.e. the Desktop PC Screen, and also on the auxiliary screen 22 in accordance with a screen update protocol. In this architecture, and when connected, the computing unit 10 retains control over the contents of the screen 22 on the auxiliary screen unit 20, sending screen update commands to a screen management application or program 250 running in the auxiliary screen unit 20, and receiving input commands from an input device management program 240.

However, as mentioned above, the auxiliary screen unit 20 is portable, and includes a portable power source (not shown). Thus it is a preferred feature of the auxiliary screen unit 20 that it is able to operate to some extent when disconnected from the computing unit 10, i.e. when the client server relationship is broken. In the disconnected mode the user is presented with a limited subset of the functional capability of the auxiliary screen unit 20 when the client-server relationship is established, so that, for example, the user may work on a document that has been downloaded to the auxiliary screen unit prior to disconnection. In the disconnected mode, the input device management program 240 operates to convey editing operations performed on the document displayed on the auxiliary screen 22 (input by means of the touch-sensitive auxiliary screen 22 and stylus 24) to a separate document viewer/editor application or program 260 (which is effectively a cut-down version of the word processing application 120), running in the auxiliary screen unit 20. This enables the performance of editing operations on text displayed on the auxiliary screen 22 when the client server relationship with the computing unit 10 is in this mode. These edits are typically stored as commands to modify the document displayed in a local store 210, so that after upload of the document to the computing unit 10 (once the client-server relationship has been re-established by re-connection), these commands can be optimally applied to the original document stored within the store 110 of the server. A synchronisation application or program 130, 230 runs in both the computing unit 10 and the auxiliary screen unit 20 respectively to download to the auxiliary screen unit 20 a current document from the computer unit 10 (which may, during the connected mode of operation be pre-cached), and to upload commands corresponding to editing operations in order to enable the contents of files (or directories/"folders" of files) which are edited on the auxiliary screen unit 20 to be synchronised (i.e. made the same as) with different versions (i.e. earlier or later) of the same files stored in the computing unit 10.

The invention claimed is:

1. Text processing apparatus comprising:
    a first text editing unit having a first screen upon which text is displayed, and a first manual actuator by means of which a user is able to interact with text displayed on the first screen;
    a second text editing unit having a second screen upon which text is displayed, and a second manual actuator by means of which a user is able to interact with text displayed on the second screen; wherein
    the first and second actuators are independently operable, and enable interaction with text displayed on respective screens independently of each other; and
    the first and second text editing units are connected to each other to enable text to be imported from one unit directly to another unit, thereby to enable text selected from a first document displayed on one unit to be inserted directly at a predetermined location in a document displayed on the other unit.

2. A text processing apparatus according to claim 1 wherein the first and second text editing units each have a graphical user interface, and interaction with text displayed on a screen is possible by using a manual actuator to interact with a visual element of the user interface on a screen.

3. A text processing system according to claim 1 wherein the visual element is either an item from a pull-down menu or an icon.

4. A text processing system according to claim 1 wherein the first text editing unit is a computer running a word processing program.

5. A text processing system according to claim 4 wherein the first and second text editing units are in a client-server relationship respectively.

6. A text processing system according to claim 5 wherein the second text editing unit includes a battery, is portable and comprises at least one processor and at least one memory to enable running of a word processing program compatible with the word processing program running on the personal-type computer.

7. A text processing system according to claim 6 wherein the word processing program of the second text editing unit is a simplified version of the word processing program running on the computer, and is adapted to run only when the first and second text editing units are disconnected, and the client-server relationship is broken.

8. A text processing system according to claim 2 wherein the manual actuator of at least one of the editing units is selected from the group consisting of a touch-sensitive screen and a mouse.

9. A text processing system according to claim 1 wherein the connection between the two editing units is selected from the group consisting of a direct cable connection; wireless Bluetooth connection; and wireless Ethernet connection.

10. A text editing system having first and second independently and simultaneously operable text editors each of which has a processor adapted to display text in a window on a visual monitor; and a manual actuator enabling interaction between a user and text displayed in the window, the system further comprising means providing interactive connection between the two editors and for enabling text selected by an actuator in a monitoring window of one text editor to be inserted in the window of another editor, and at a location specified by the manual actuator of the other editor.

11. A text editing system according to claim 10 comprising first and second distinct monitors for the first and second text editors.

12. A text editing system according to claim 10, wherein at least one of the actuators is a mouse.

13. A text editing system according to claim 12 wherein one of the actuators is a touch-sensitive screen in combination with an artifact for touching the screen.

14. A text editing system according to claim 10 wherein the manual actuators are adapted to operate in conjunction with a graphical user interface in each of the windows.

15. A method of editing text comprising the steps of:
operating a first text editor to select text from a first document which is displayed in a first text-displaying visual window;
simultaneously operating a second text editor, operably distinct from the first text editor, to select a location within a second document, displayed on a second text-displaying visual window, at which the selected text of the first document is to be inserted; and
operating a graphical user interface in one of the windows to insert the selected text into the second document at the specified location.

16. A method according to claim 15, further wherein selection of the text in the first document is performed by operating a first manual actuator in conjunction with a graphical user interface for the first text editor, and selection of the location in the second document is performed by operating a second manual actuator; distinct from the first manual actuator, in conjunction with a graphical user interface for the second text editor.

17. A method according to claim 16, wherein the first and second text-displaying visual windows are provided on first and second monitors.

18. A method according to claim 15, wherein the first and second text editors are hosted on physically distinct machines, and the method includes sending text from a first machine to a second machine via a wireless link.

* * * * *